No. 841,385. PATENTED JAN. 15, 1907.
J. R. FORDYCE.
METHOD OF GINNING COTTON.
APPLICATION FILED JULY 11, 1904.
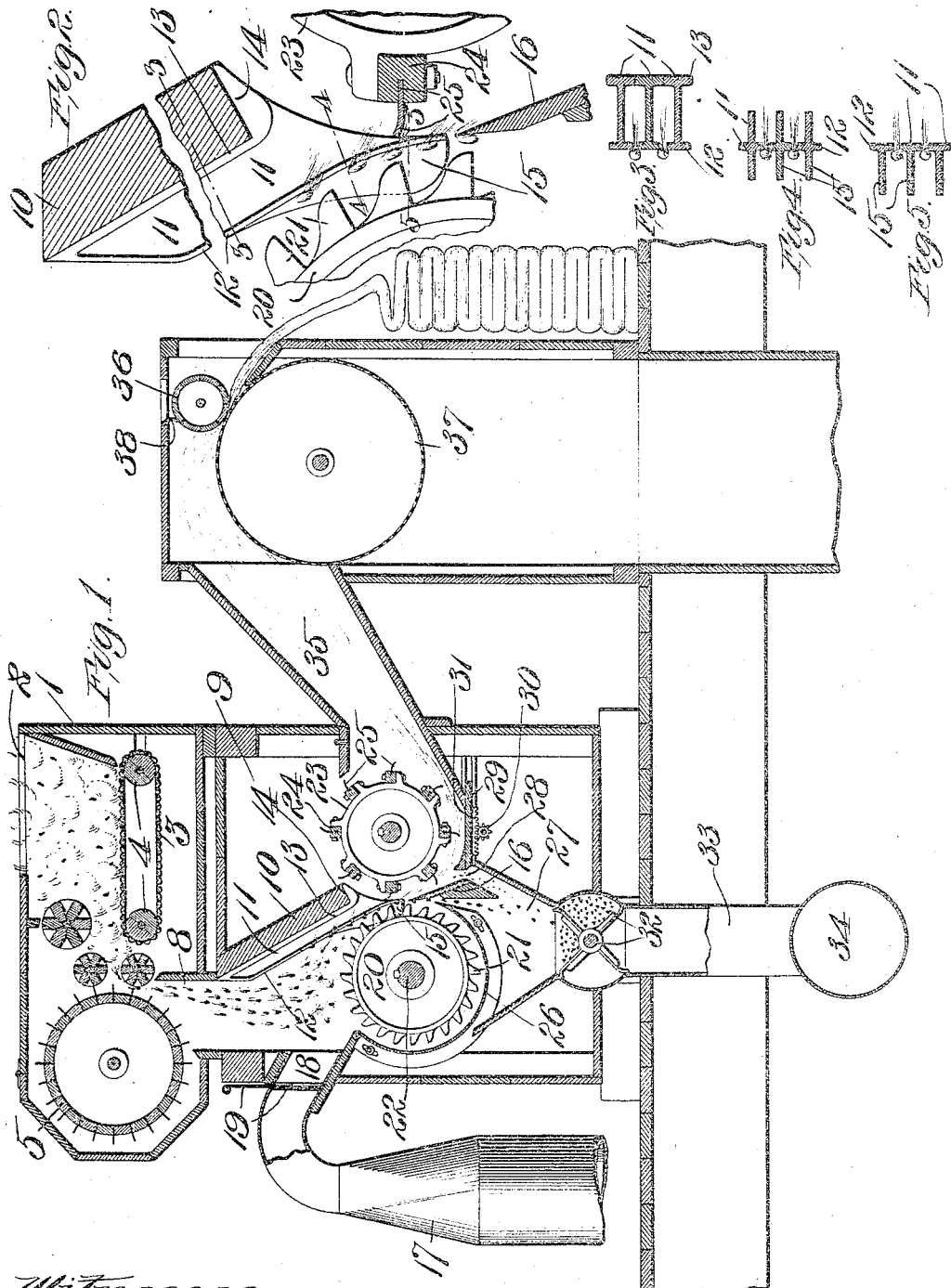
Witnesses.
Wm. H. Scott
B. F. Funk
Inventor:
John R. Fordyce,
by Bakewell & Cornwall
Attys.

UNITED STATES PATENT OFFICE.

JOHN R. FORDYCE, OF LITTLE ROCK, ARKANSAS.

METHOD OF GINNING COTTON.

No. 841,385.　　　　Specification of Letters Patent.　　　　Patented Jan. 15, 1907.

Application filed July 11, 1904. Serial No. 216,114.

*To all whom it may concern:*

Be it known that I, JOHN R. FORDYCE, a citizen of the United States, residing at Little Rock, Pulaski county, Arkansas, have invented a certain new and useful Improvement in Methods of Ginning Cotton, of which the following is a full, clear, and exact description, such as will enable others skilled in the art to which it appertains to make and use the same, reference being had to the accompanying drawings, forming part of this specification, in which—

Figure 1 is a vertical longitudinal sectional view of an apparatus for carrying out my improved method of ginning cotton. Fig. 2 is a fragmentary sectional view of the separating-bars, a portion of the beater, and a portion of the brush. Fig. 3 is a cross-sectional view through the separator-bars on the line 3 3 of Fig. 2. Fig. 4 is a cross-sectional view on the line 4 4 of Fig. 2, and Fig. 5 is a cross-sectional view on the line 5 5 of Fig. 2.

This invention relates to ginning cotton; and the primary object is to provide an improved method for separating the fibers from the seed, so that the removed fibers will be of such lengths as are best suited for spinning.

It is recognized that the value of cotton depends materially upon the lengths of the fibers, the short-fibered cotton being of considerably less value than the long-fibered cotton. The method pursued by me and carried out in accordance with the one described in this application permits the fibers to be removed from the seed without becoming broken and finally carries them in unbroken lengths to the bat-forming rollers, whence they are deposited upon a suitable receptacle.

In Figs. 1 to 5 I have illustrated one form of apparatus which may be used for carrying out my improved method, and this apparatus is illustrated as comprising a cotton-gin, a feeder therefor, and a bat-forming mechanism.

The feeder 1 is provided with an inlet-opening 2, below which is an endless apron 3, passing around the drive-rollers 4. The picker-roller 5 is at one end of the feeder, and adjacent to the picker-roller is a plurality of compression-rollers 6, which burst the bolls as they are fed into the machine. 7 designates a compression-roller above the endless apron and which initially disturbs the bolls as they are fed into the machine and before they come into contact with the rollers 6. After the picker-roller 5 has torn the leaf-trash and other foreign substances from the locks and has sufficiently torn the cotton the said cotton is fed through the chute 8 into the gin 9. By the term "locks" I mean that part of the cotton which is incased in the covering or boll and which consists of the seed with the cotton fibers therearound. Secured to the inclined timber 10 of the gin 9 is a plurality of separator-bars, (designated by the numeral 11,) said bars coöperating to form a slotted member, as hereinafter described. These bars are best illustrated in cross-section in Figs. 3, 4, and 5. The bars 11 are of peculiar shape, and they consist each in a web portion with edge flanges 12 and 13. The web portion is curved at its lower extremity and terminates adjacent to the flange 13 in a seat 14, which bears against one end of the timber 10. The flange 12 extends down to a point below the extremity of the flange 13 and carries a centrally-disposed fin 15, which, in conjunction with the fin on the adjacent bar, acts as a guide for the beater-hammers, to be referred to hereinafter.

By reference to Figs. 3, 4, and 5 it will be observed that the flanges 12 are of less width than the flanges 13 on the respective bars. Thus when the flanges 13 are placed edge to edge a slight space is left between the adjacent edges of the flanges 12 of the respective bars which constitute slots through which the fibers can pass without permitting the seed to pass. Below the ends of the respective bars and spaced a short distance therefrom is a bar 16, provided with a knife-edge, the purpose of which will be hereinafter made apparent.

17 designates a conveyer for an air-blast, which has an outlet 18 in line with the slotted member formed by the bars 11, so that as the locks are fed down through the chute 8 the air-blast will force the fibers through the slots formed by the flanges 12 of the bars, and this blast will have a tendency to keep the seed in contact with the bars as it slides down the same and also forces said seed through a discharge passage-way. The volume of air may be regulated by the valve 19, which is arranged adjacent to the inlet-opening in the ginning-machine. The blast of air passes through the machine in a curved path, and as the heavy particles have a tendency to go straight the locks are held in engagement with the slotted member practically by centrifugal force.

20 designates the beater, which may consist of a plurality of disks having teeth 21 or a single cylinder provided with the teeth 21, the disks or cylinders, as the case may be, being keyed or otherwise fastened to the shaft 22, which is driven by suitable power. The teeth 21 may properly be termed "hammers," inasmuch as they are designed to knock against or contact with the seed.

Adjacent to the beater and on the opposite side of the bars 11 is a brush 23, which is provided with a plurality of longitudinally-disposed strips 24, carrying flexible lint-separators 25. As locks are fed through the chute 8 and against the bars 11 the blast of air will be sufficient to force the fibers through the slots between the bars, as above described, and during this operation the lint is divided on either side of a parting-line on the seed, so that the action of the beater 20 and the brush 23 will result in causing the seed to come intermittently in contact with the knife-edge of the bar 16, whereby the lint will be torn from the seed without breaking the fibers thereof. The adjustable screen 26 conforms to the contour of the beater 20, and the free end thereof can be adjusted toward and away from the bar 16, as occasion may require.

It is desirable that a sufficient space be maintained between the free end of the screen and the bar to permit the seed from which the lint has been removed to pass into the hopper 27, the air-blast operating to force the seed through this passage-way. The motes which pass through the space between the edges of the bars 11 and the edge of the bar 16 will pass into the hopper 27 through the opening 28. The size of this opening may be governed by sliding the adjusting-board 29 toward and away from the bar 16. This adjustment can be accomplished by actuating the pinion 30, which is in mesh with the rack 31 on the board 29.

In order that the proper degree of pressure may be exerted upon the lint and the seed and in order to prevent any back or counter currents of air, I have provided a pocket-valve 32, which is positioned at the bottom of the hopper 27, said valve being provided with a plurality of radial blades so disposed that the discharge-opening in the hopper 27 will be at all times closed. As the pockets successively become filled with the seed the valve will be caused to partially rotate, so that the seed will drop into the tube 33 and be deposited into a receptacle 34, from which they can be removed.

As the lint passes by the brush the blast of air will force it through the chute 35 and between the bat-forming rollers 36 and 37. It will be observed that the roller 37 consists of suitable reticulated material, or it may otherwise be perforated, so that the air between the fibers of the cotton will be pressed therefrom during the formation of the bat. The scraper 38, depending from the top of the roller-casing, is for the purpose of removing any cotton fibers adhering to the roller 36.

From the description of the preferred embodiment of the apparatus for carrying out my method it will be apparent that the lint is removed by first introducing the cotton-bolls into a feeder, separating the cotton-seed from the leaf-trash, &c., subjecting the cotton-seed to an air-blast to force the same into engagement with a slotted member, which permits only the fibers to pass therethrough, the separation of the fibers and seed being aided by some mechanical means, such as a brush, and thereafter forcing the fibers into contact with the bat-forming rollers by means of said air-blast. Thus the fibers are sufficiently removed without being subjected to any detrimental influence.

While I have herein shown the slotted member as being stationary and the mechanical means which coöperates with the air-blast to separate the fiber and seed as consisting of a rotary brush, it is obvious that this mechanical means could be stationary and the slotted member be in the form of a rotary device without departing from the scope of my invention.

Having thus described the invention, what is claimed as new, and desired to be secured by Letters Patent, is—

1. The herein-described method of ginning cotton which consists in subjecting locks of cotton to a gaseous blast while the seeds are prevented from moving with the blast whereby the fiber of each lock is caused to extend in a certain direction from the seed, and thereafter pulling the fiber and seed in opposite directions to separate them; substantially as described.

2. The herein-described method of ginning cotton which consists in subjecting locks of cotton to a gaseous blast while the seeds are prevented from moving with the blast whereby the fiber of each lock is caused to extend in a certain direction from the seed, and then subjecting the seeds to a beating action and the fiber to a brushing action to separate the same; substantially as described.

3. The herein-described method of ginning cotton which consists in subjecting locks of cotton to a continuous gaseous blast while the seeds of the locks are prevented from moving with the blast whereby the fibers are caused to extend in a certain direction from the seeds, and then pulling the seeds and fiber in opposite directions over a stationary member to separate them; substantially as described.

4. The herein-described method of ginning cotton which consists in tearing up a mass of cotton locks, separating the locks from each other, then subjecting the locks to a continuous gaseous blast while the seeds are prevented from moving with the blast whereby the fibers are caused to extend in a certain direction from the seeds, and then subjecting the seeds to a beating action and the fibers to a pulling action to separate them; substantially as described.

5. The method of ginning cotton which consists in tearing up and combing a mass of seed-cotton, then subjecting the cotton locks to a continuous blast while the seeds are prevented from moving with the blast whereby the fiber of each lock is caused to extend in a certain direction from the seed, then pulling the seeds and fiber in opposite directions over a stationary member to separate them, and thereafter forming the fiber into bats; substantially as described.

In testimony whereof I hereunto affix my signature, in the presence of two witnesses. this 2d day of July, 1904.

JOHN R. FORDYCE.

Witnesses:
R. W. HALL,
J. MELANCON.